May 19, 1959

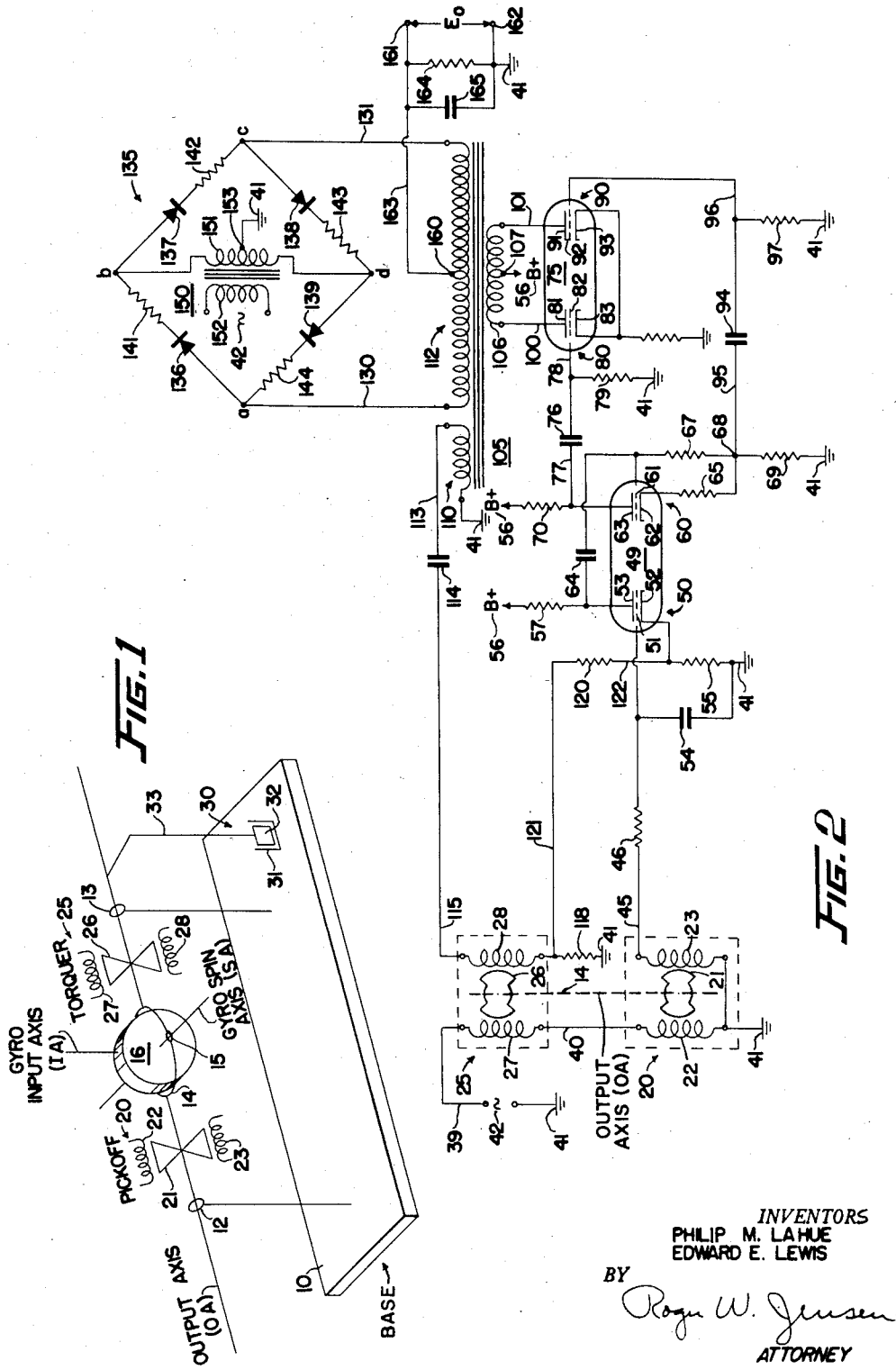

P. M. LA HUE ET AL 2,887,636

GYROSCOPIC APPARATUS SERVOSYSTEM

Filed Nov. 9, 1956

INVENTORS
PHILIP M. LA HUE
EDWARD E. LEWIS

BY

*Roger W. Jensen*

ATTORNEY

United States Patent Office 2,887,636
Patented May 19, 1959

2,887,636

GYROSCOPIC APPARATUS SERVOSYSTEM

Philip M. La Hue, St. Paul, and Edward E. Lewis, Minneapolis, Minn., assignors to Minneapolis-Honeywell Regulator Company, Minneapolis, Minn., a corporation of Delaware Application November 9, 1956, Serial No. 621,315

9 Claims. (Cl. 318—28)

This invention pertains generally to gyroscopes and more specifically to the type of gyroscopes known in the art as "floated" gyros. A floated gyro includes a spin motor contained within a hermetically sealed gimbal assembly for rotation about a spin axis with the gimbal assembly in turn supported on a base for rotation about an output axis which is normal to the gyro spin axis. The gimbal assembly is floated in a viscous liquid and the gimbal assembly is supported by delicate jewel type bearings for rotation about the output axis, the viscous fluid supporting substantially all of the gimbal assembly's weight so that there is virtually no load on the bearings defining the output axis. This arrangement permits very delicate output axis bearings which have a very low friction level and consequently the floated type of gyro has very low errors and is very sensitive. The viscous fluid in addition to floating the gimbal assembly serves as a viscous damper for damping rotation of the gimbal assembly about the output axis and for integrating the gimbal assembly rotation about the output axis. A floated gyro has associated with the gimbal assembly a signal generator pickoff and a torque generator. The signal generator pickoff detects relative rotation between the gimbal assembly and the base producing a signal as a function of the gimbal assembly away from its normal position relative to the base. The torque generator usually has a movable member connected to the gimbal assembly and has control means which, when energized, cause a torque to be imparted to the gimbal assembly so as to rotate the gimbal assembly about the output axis.

One use of a floated gyro such as described above is for sensing rate of turn about the input axis which is defined as the axis perpendicular to both the gyro spin axis and the gyro output axis. When used as a rate of turn sensing gyro the operation is as follows. As the gyro is turned about its input axis the gimbal assembly tends to turn about the output axis due to the precessional torque developed by the spin motor. The signal generator pickoff detects the relative rotation between the gimbal assembly and the base which signal is amplified and fed to the signal responsive means of the torque generator which produces a torque acting on the gimbal assembly about the output axis of such a direction and magnitude so as to maintain the gimbal assembly substantially at its normal or neutral position. The greater the rate of turn, the greater the energization to the signal responsive means of the torque generator needed to keep the gimbal assembly at its neutral position. Thus the energization supplied the control means of the torque generator is a measure of the rate of turn of the gyro about its input axis.

Due to the delicate nature of the floated gyros the signal generator pickoffs usually are of the inductive type which produce an alternating current signal of a phase and magnitude proportional to the direction and amount of deviation or rotation of the gimbal assembly away from its normal position.

The control means of the torque generator in some applications respond to direct current signals and in other applications respond to alternating current signals. Generally if the output signal to be sent to a load device is to be an alternating current signal then it is most convenient to have an alternating current signal fed back to the torquer control means. If it is desired to have a direct current signal for the load device, the prior art technique was to rectify the alternating current signal from the signal generator pickoff so as to convert it into a direct current signal and then apply this direct current signal to the control means of the torque generator. There are several disadvantages to using this type of arrangement. For one thing the filtering inherent in the rectification means for obtaining the direct current signal introduces a certain time lag into the gyro rate circuit and adversely affects the frequency response and stability of the system. The use of an alternating current signal for energizing the control means of the torquer has the advantage over the direct current signal of much better frequency response and no time lag.

The present invention is directed to a new combination of elements which permits obtaining a direct current output signal which is indicative of the rate of turn of the gyro about the input axis and yet allows the use of an alternating current signal to be applied to the control means of the torque generator for gimbal torquing purposes. Thus, according to the present invention, any filtering need to obtain a direct current output signal has no effect on the alternating current signal fed back to the torquer and hence has no effect on the frequency response of the gyro unit.

An object of the invention therefore is to provide an improved gyroscopic apparatus.

A further object of the invention is to provide a gyroscopic apparatus which permits the use of an alternating current signal to control the torque generator and which provides a direct current output signal for control purposes.

Other objects of the invention will become apparent from a reading of the following specification and appended claims in conjunction with the accompanying drawings in which:

Figure 1 is a schematic representation of a single degree of freedom rate integrating gyro with which the present invention may be used;

Figure 2 is a schematic wiring diagram of the torque generator, signal generator, amplifying means, and demodulator means together with the connection means between these elements as taught by the present invention; and Figure 3 is an alternate schematic wiring diagram.

The gyroscopic apparatus shown schematically in Figure 1 includes a base or housing or case member 10 having associated therewith a pair of bearing means 12 and 13 which define a gyro output axis OA. A gyro gimbal 14 is supported in bearing means 12 and 13 for rotation about the gyro output axis OA and has suitable bearing means 15 for supporting a gyro rotor 16 for rotation about a gyro spin axis SA. The gyro spin axis is normally perpendicular to the gyro output axis. The gyro input axis is identified by the reference letter IA and it is perpendicular to both the gyro spin axis and the gyro output axis.

A signal generator pickoff 20 comprises a rotor or armature portion 21 connected to the gimbal 14, a primary winding 22, and a secondary or signal generating winding 23.

A torque or force generator 25 comprises a rotor or armature member 26 connected to the gimbal 14, a primary winding 27, and a secondary or energizable control winding 28. A damping mechanism 30 having a first member 31 secured to base member 10 and a second member 32 connected to the gimbal 14 by a lever arm 33, represents the viscous damping inherently provided in a floated gyro wherein the gimbal is floated relative to the housing by a viscous damping fluid.

The gyroscopic device shown in Figure 1 may well be of the type shown in the Jarosh et al. Patent 2,752,791 issued July 3, 1956. Further, the signal generator pickoff 20 and the torque generator 25 may be of the type described in the Mueller Patent 2,488,734 issued November 22, 1949.

In Figure 2 the signal generator pickoff 20 is represented to the extent that primary winding 22, secondary winding 23, and armature portion 21 are shown. Likewise, the torque generator 25 is represented by primary winding 27, secondary or control winding 28 and armature member 26. The armatures 21 and 26 are shown attached to the gimbal 14 for rotation therewith about the output axis (OA). Primary winding 27 of torque generator 25 and primary winding 22 of signal generator 20 are connected in series by connecting leads 39 and 40 between ground 41 and a source of alternating current voltage 42. If desired, primary windings 27 and 22 of torque generator 25 and signal generator 20 may be separately energized.

When the gimbal 14 is at its neutral or normal position relative to base 10 no signal will be developed in secondary winding 23 of the signal generator 20. However, when there is a relative rotation between gimbal 14 and base member 10 then an alternating current signal is developed at secondary winding 23 of signal generator pickoff 20 of a phase and magnitude according to the direction and amount of deviation or rotation of the gimbal away from its normal or neutral position. The secondary winding 23 of the signal generator pickoff 20 is connected on one side to ground 41 and on the other through a connection lead 45 and a resistor 46 to a grid 51 of the first section 50 of a twin triode vacuum tube 49. A condenser 54 is connected between grid 51, and ground 41 and a cathode resistor 55 is connected between ground 41 and a cathode 52 of section 50 of tube 49. A plate 53 of section 50 of tube 49 is connected to a source of B plus or relatively high potential direct current voltage 56 through a plate resistor 57.

The second triode section of vacuum tube 49 is identified by reference numeral 60 and comprises a grid 61, a cathode 62 and a plate 63. Triode section 50 of tube 49 amplifies the alternating current signal from secondary winding 23 of the signal generator pickoff 20 and this amplified signal is coupled to grid 61 of section 60 of tube 49 from the plate 53 of tube 50 through a coupling condenser 64 connected between plate 53 of section 50 and the grid 61 of section 60. A cathode resistor 65 is connected at one end to cathode 62 of section 60 of tube 49 and a grid resistor 67 is connected at one end to the grid 61 of section 60 of tube 49. The other ends of resistors 65 and 67 are connected together as at 68 and connected between point 68 and ground 41 is an additional resistor 69. Plate 63 of section 60 of tube 49 is connected to the source of B plus 56 through a plate resistor 70.

A second twin triode 75 is provided and comprises a first triode section 80 and a second triode section 90, comprising respectively plate members 81 and 91, grid members 82 and 92, and cathode sections 83 and 93. Sections 80 and 90 of tube 75 serve as a power amplifier of the signal received from section 60 of tube 49. A resistive capacitance coupling is provided between grid 82 of section 80 of tube 75 and plate 63 of section 60 of tube 49. A condenser 76 is connected by a lead 77 to plate 63 and on the other side to grid 82 by a connection lead 78. A grid resistor 79 is connected between grid 82 and ground 41. A cathode follower arrangement is used as a signal provision means for section 90 of vacuum tube 75. This includes a condenser 94 connected on one side to junction point 68 through a connection lead 95 and on the other side to grid 92 of section 90 of vacuum tube 75 by a connection lead 96. A grid resistor 97 is connected on one side to grid 92 by connection lead 96 and on the other side to ground 41. Plate members 81 and 91 of sections 80 and 90 respectively of vacuum tube 75 are connected by leads 100 and 101 respectively to the ends of a center tapped primary winding 106 of a power transformer or output transformer 105. The center tap 107 of the primary winding 106 is connected to B plus 56. Power or output transformer 105 has two secondary windings 110 and 112. Secondary 110 is grounded on one end at 41 and the other end of secondary winding 110 is connected through a connection lead 113, an impedance matching condenser 114, and another connection lead 115 to one side of control winding 28 of the torque generator 25. The other side of control winding 28 of torquer 25 is connected by a lead 117 to a resistor 118 the other side of which is grounded at 41. A stabilization resistor 120 is connected between connection lead 117 and cathode 52 of section 50 of vacuum tube 49 by connection leads 121 and 122.

The second secondary winding 112 of the output transformer 105 is connected at its ends by leads 130 and 131 across one diagonal a—c of a bridge a—b—c—d having the general reference numeral 135 and which comprises four rectifiers 136, 137, 138, and 139 each positioned in one arm of the bridge and arranged so as to conduct current in the same direction around the bridge. In series with rectifiers 136—139 in arms a—b, b—c, c—d, and d—a respectively are resistors 141, 142, 143, and 144. Across the other diagonal b—d of the bridge 135 is connected the secondary winding 151 of a transformer 150 the primary winding 152 of which is energized by the source of alternating current 42. Secondary winding 151 is center tapped at 153 and connected to ground 41.

Secondary winding 112 of output transformer 105 is center tapped at 160. Center tap 160 of secondary winding 112 is connected to a first output terminal 161 through a connection lead 163. A second output terminal 162 is connected to ground 41. A resistor 164 and a condenser 165 are connected between connection lead 163 and ground 41.

Secondary winding 112 of the output transformer 105, bridge 135, and resistor 164 and condenser 165 constitute a phase sensitive rectifier or demodulator wherein an output direct current voltage is developed across output terminals 161 and 162 of a polarity and magnitude proportional to the phase and magnitude of an alternating current signal voltage developed in secondary winding 112 of the output transformer 105.

Other demodulator circuits may be used in connection with this invention. In Figure 3, an alternative arrangement is shown wherein the same circuit as Figure 2 is shown with the exception of a different demodulator being provided. Thus components in Figure 3 having the same function as in Figure 2 are identified by the same reference numeral. Again an output transformer 105 is provided having a secondary winding 110 and a second secondary winding 112. Here, secondary winding 112 is connected at its ends through connection leads 130 and 131 across one diagonal e—g of a bridge circuit e, f, g, h having the general reference numeral 175. Bridge circuit 175 includes four rectifiers 176, 177, 178 and 179 arranged in the four arms of the bridge so as to conduct current in the same direction about the bridge. Across the other diagonal f—h of the bridge 175 is connected a pair of resistors 182 and 183 by connection leads 184 and 185, resistors 182 and 183 being connected together at 186. A reference voltage transformer 190 is provided and comprises a primary winding 191 connected to a source of alternating current 42 and a secondary winding 192 one side of which is connected by a lead 193 to center tap 160 of secondary winding 112 of power transformer 105 and the other side of which is connected by a connection lead 194 to point 186 between resistors 182 and 183. Also connected across the other diagonal *f—h* of the bridge 175 is an output circuit including a resistor 196 and a condenser 197 in parallel with one another. A direct current voltage will be developed across diagonal *f—h* of a polarity and magnitude according to the phase and magnitude of the voltage induced in secondary winding 112 relative to the reference voltage developed in secondary winding 192 of transformer 190.

*Operation*

To explain the operation of this apparatus a turning of the gyro about its input axis may be assumed. The turning about the input axis IA results in a precession of the gyro and a turning of the gimbal 14 about its output axis OA resulting in a displacement between the rotor or armature 21 and the windings 22 and 23 of the signal generator pickoff 20. An alternating current signal is induced in secondary winding 23 of pickoff 20 and is applied to grid 51 of section 50 of vacuum tube 49 which is amplified therein and applied through coupling condenser 64 to grid 61 of section 60 of vacuum tube 49. Section 60 of vacuum tube 49 is a phase splitter, the split signal is then applied through coupling condensers 76 and 94 to grids 82 and 92 of sections 80 and 90 respectively of vacuum tube 75. Further amplification of the signal is accomplished by vacuum tube 75 and there are induced in secondary windings 110 and 112 of the power or output transformer 105 alternating current signals of a phase and magnitude according to the phase and magnitude of the signal developed in secondary winding 23 of the signal generator pickoff 20. The signal induced in secondary winding 110 of transformer 105 is fed back through coupling condenser 114 to the control winding 28 of torque generator 25 and exerts a torque on the gimbal 14 of such a direction so as to tend to return the gimbal to its normal or neutral position. As long as a turning about the gyro input axis IA exists a signal will be developed in secondary winding 23 of signal generator pickoff 20 and accordingly a torque will be developed by the control winding 28 of torque generator 25 being energized in a sufficient amount to keep the gimbal 14 of the gyro at a point where the torque developed by the torque generator 25 will offset the precessional torque caused by turning of the gyro about its input axis IA. The signals developed in secondary winding 110 and 112 of the output or power transformer 105 are thus true measures of the rate of turn of the gyro about its input axis 18. By having a direct connection between secondary winding 110 of output transformer 105 and secondary winding 28 of torque generator 25 (capacitor 114 being used for impedance matching purposes) the frequency response of the loop between the signal generator pickoff 20 and the torque generator 25 can be very good in comparison to having a direct current signal fed back to the secondary winding of the torque generator.

By utilizing a demodulator of the types shown in Figure 2 and Figure 3, a direct current output voltage for control purposes, the direct current signal being a true measure of the rate of turn about the input axis IA, can be obtained. The alternating current signal developed in secondary winding 112 of power or output transformer 105 is demodulated by the apparatus described in Figure 2 and Figure 3 so that a direct current voltage is produced across the output terminals (161—162 in Figure 2 and *f—h* in Figure 3).

With the present invention, therefore, an arrangement is provided in a rate of turn sensing system for providing a direct current output signal voltage of a polarity and magnitude according to the sense and magnitude of rate of turn about the input axis of the gyro and at the same time an alternating current signal voltage may be utilized for completing the loop between the signal generator pickoff and the torque generator used to develop a torque equal and opposite to the precessional torque on the gyro caused by the turning of the gyro about its input axis.

While full wave type demodulators have been illustrated in Figures 2 and 3, the invention should not be limited to such embodiments but should also be extended to half wave demodulators well known in the art.

While we have shown and described specific embodiments of this invention, further modification and improvement will occur to those skilled in the art. We desire it to be understood, therefore, that this invention is not limited to the particular forms shown and we intend that the appended claims cover all modifications which do not depart from the spirit and scope of this invention.

What we claim is:

1. In a gyroscope: a base; a gimbal; a rotor; means on said base for supporting said gimbal for rotation about an output axis; means on said gimbal for supporting said rotor for rotation of said rotor about a spin axis, said spin axis being at an angle to said output axis and said gimbal having a normal position relative to said base; a signal generator pickoff mounted on said gimbal and said base for sensing relative rotation between said gimbal and said base and for developing a signal as a function of the amount of rotation of said gimbal away from said normal position; a torque generator having a movable member attached to said gimbal and having control means which when energized cause, through said movable member, a torque to be applied to said gimbal; a signal amplifying means connected to said pickoff for amplifying said signal and including an output transformer having first and second secondary winding means; means including said second secondary winding means for demodulating the signal from said signal amplifying means; load terminal means; means connecting said first secondary winding means to said control means of said torque generator; and means connecting said demodulating means to said load terminal means.

2. In a gyroscope: a base; a gimbal; a rotor; means for supporting said gimbal for rotation relative to said base about an output axis; means for supporting said rotor for rotation of said rotor relative to said gimbal about a spin axis, said spin axis being at an angle to said output axis and said gimbal having a normal position relative to said base; a signal generator pickoff for sensing relative rotation between said gimbal and said base and for developing a signal as a function of the amount of rotation of said gimbal away from said normal position; a torque generator having movable means attached to said gimbal and having control means which when energized cause, through said movable means, a torque to be applied to said gimbal; signal amplifying means connected to said pickoff for amplifying said signal and including an output transformer having first and second secondary winding means; means including said second secondary winding means for demodulating the signal from said signal amplifying means; load terminal means; means connecting said first secondary winding means to said control means of said torque generator; and means connecting said demodulating means to said load terminal means.

3. In a gyroscope: a base; gimbal means; rotor means; means for supporting said gimbal means for rotation relative to said base about an output axis; means for supporting said rotor means for rotation of said rotor means relative to said gimbal means about a spin axis, said gimbal means having a normal position relative to said base; signal generator pickoff means for sensing relative rotation between said gimbal means and said base and for developing a signal as a function of rotation of said gimbal means away from said normal position; torque generator means having movable means connected to said gimbal means and having control means which when energized cause, through said movable means, a torque to be applied to said gimbal means; signal amplifying means connected to said pickoff means for amplifying said signal and including output means having first and second winding means; means including said second winding means for demodulating the signal from said signal amplifying means; load terminal means; means connecting said first winding means to said control means of said torque generator means; and means connecting said demodulating means to said load terminal means.

4. In a gyroscope: a base; a gimbal; a rotor; means for supporting said gimbal for rotation relative to said base about an output axis; means for supporting said rotor for rotation of said rotor relative to said gimbal about a spin axis, said gimbal having a normal position relative to said base; signal generator pickoff means for sensing relative rotation between said gimbal and said base and for developing a signal as a function of rotation of said gimbal away from said normal position; torque generator means having movable means connected to said gimbal and having control means which when energized cause, through said movable means, a torque to be applied to said gimbal; signal amplifying means connected to said pickoff means for amplifying said signal and including first and second output means; means including said second output means for demodulating said signal from said signal amplifying means; load terminal means; means connecting said first output means to said control means of said torque generator means; and means connecting said demodulating means to said load terminal means.

5. In a gyroscope: a base; gimbal means; rotor means; means for supporting said gimbal means for rotation relative to said base about an output axis; means for supporting said rotor means for rotation of said rotor means relative to said gimbal means about a spin axis, said gimbal means having a normal position relative to said base; signal generator pickoff means for sensing relative rotation between said gimbal means and said base and for developing an alternating current signal as a function of rotation of said gimbal away from said normal position; torque generator means having control means which when energized cause a torque to be applied to said gimbal; signal amplifying means connected to said pickoff for amplifying said alternating current signal and including an output transformer having first and second secondary winding means; means including said second secondary winding means for demodulating said alternating current signal from said signal amplifying means; load terminal means; means connecting said first secondary winding means to said control means of said torque generator means so as to apply a torque to said gimbal means in a direction which will tend to return said gimbal means to said normal position; and means connecting said demodulating means to said load terminal means so that a direct current signal is applied to said terminal means.

6. In a gyroscope: a base; a gimbal; a rotor; means on said base for supporting said gimbal for rotation about an output axis; means on said gimbal for supporting said rotor for rotation of said rotor about a spin axis, said spin axis being at an angle to said output axis and said gimbal having a normal position relative to said base; a signal generator pickoff mounted on said gimbal and said base for sensing relative rotation between said gimbal and said base and for developing an alternating current signal as a function of the amount of deviation of said gimbal away from said normal position; a torque generator having a movable member attached to said gimbal and having control means which when energized cause, through said movable member, a torque to be applied to said gimbal; signal amplifying means connected to said pickoff for amplifying said alternating current signal and including an output transformer having first and second secondary winding means; means including said second secondary winding means for demodulating said alternating current signal from said signal amplifying means; load terminal means; means connecting said first secondary winding means to said control means of said torque generator so as to apply a torque to said gimbal in a direction which will tend to return said gimbal to said normal position; and means connecting said demodulating means to said load terminal means so that a direct current signal is applied to said terminal means.

7. In a gyroscope: a base; gimbal means; rotor means; means for supporting said gimbal means for rotation relative to said base; means for supporting said rotor means for rotation of said rotor means relative to said gimbal means about a spin axis, said gimbal means having a normal position relative to said base; signal generator pickoff means for sensing relative rotation between said gimbal means and said base and for developing an alternating current signal as a function of movement of said gimbal means away from said normal position; torque producing means having movable means connected to said gimbal means and having control means which when energized cause, through said movable means, a torque to be applied to said gimbal means; signal amplifying means connected to said pickoff means for amplifying said alternating current signal and including an output transformer having first and second secondary winding means; means including said second secondary winding means for demodulating said alternating current signal from said signal amplifying means; load terminal means; means connecting said first secondary winding means to said control means of said torque producing means so as to apply a torque to said gimbal means in a direction which will tend to return said gimbal to said normal position and means connecting said demodulating means to said load terminal means so that a direct current signal is applied to said terminal means.

8. In a gyroscope: a base; gimbal means; rotor means; means supporting said gimbal means for rotation relative to said base; means for supporting said rotor for rotation of said rotor relative to said gimbal means about a spin axis, said gimbal having a normal position relative to said base; signal generator pickoff means for sensing relative rotation between said gimbal means and said base and for developing an alternating current signal as a function of deviation of said gimbal means away from said normal position; torque producing means having control means which when energized cause a torque to be applied to said gimbal means; signal amplifying means connected to said pickoff means for amplifying said alternating current signal and including first and second output means; means connecting said first output means to said control means of said torque producing means; means including said second output means for demodulating said alternating current signal from said signal amplifying means; load terminal means; and means connecting said demodulating means to said load terminal means.

9. In a gyroscope: a base; gimbal means; rotor means; means supporting said gimbal means for rotation relative to said base; means for supporting said rotor for rotation of said rotor relative to said gimbal means about a spin axis, said gimbal having a normal position relative to said base; signal generator pickoff means for sensing relative rotation between said gimbal means and said base and for developing an alternating current signal as a function of deviation of said gimbal means away from said normal position; torque producing means having control means which when energized cause a torque to be applied to said gimbal means; means connected to receive said alternating current signal for giving first and second alternating current outputs which vary in accordance with said alternating current signal; means connecting said first alternating current output to said control means of said torque producing means; demodulating means; means connecting said second alternating current output to said demodulating means; load terminal means; and means connecting said demodulating means to said load terminal means.

References Cited in the file of this patent

UNITED STATES PATENTS

| | | |
|---|---|---|
| 2,508,082 | Wald | May 16, 1950 |
| 2,700,739 | Orlando | Jan. 25, 1955 |
| 2,752,790 | Draper | July 3, 1956 |